(12) United States Patent
Hayakawa et al.

(10) Patent No.: US 7,848,231 B2
(45) Date of Patent: Dec. 7, 2010

(54) PACKET COMMUNICATION NETWORK AND PACKET COMMUNICATION METHOD

(75) Inventors: Kazuhiro Hayakawa, Kanagawa (JP); Satoru Yoshida, Tokyo (JP); Makoto Fukuda, Tokyo (JP); Nobuo Shigeta, Tokyo (JP); Kazuhiko Ogawa, Tokyo (JP); Shin Hashimoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1184 days.

(21) Appl. No.: 10/585,569

(22) PCT Filed: Oct. 25, 2005

(86) PCT No.: PCT/JP2005/019628
§ 371 (c)(1),
(2), (4) Date: Jul. 10, 2006

(87) PCT Pub. No.: WO2006/046577
PCT Pub. Date: May 4, 2006

(65) Prior Publication Data
US 2009/0147793 A1    Jun. 11, 2009

(30) Foreign Application Priority Data
Oct. 29, 2004    (JP)    ............... 2004-316107

(51) Int. Cl.
*G01R 31/08* (2006.01)
*G06F 11/00* (2006.01)
*H04L 12/28* (2006.01)
*H04L 12/56* (2006.01)
*H04J 3/02* (2006.01)

(52) U.S. Cl. ............... 370/230; 370/392; 370/395.42; 370/537

(58) Field of Classification Search ............ None
See application file for complete search history.

(56) References Cited

U.S. PATENT DOCUMENTS

| | | | |
|---|---|---|---|
| 6,374,112 B1 * | 4/2002 | Widegren et al. | 455/452.2 |
| 6,466,556 B1 * | 10/2002 | Boudreaux | 370/331 |
| 6,690,679 B1 | 2/2004 | Turunen et al. | |
| 6,760,303 B1 * | 7/2004 | Brouwer | 370/229 |
| 6,781,971 B1 * | 8/2004 | Davis et al. | 370/329 |
| 6,842,463 B1 * | 1/2005 | Drwiega et al. | 370/468 |
| 6,941,132 B2 * | 9/2005 | Van Lieshout et al. | 455/418 |

(Continued)

FOREIGN PATENT DOCUMENTS

JP    2000-59377    2/2000

(Continued)

*Primary Examiner*—Chirag G Shah
*Assistant Examiner*—Ashley L Shivers
(74) *Attorney, Agent, or Firm*—Oblon, Spivak, McClelland, Maier & Neustadt, L.L.P.

(57) ABSTRACT

A packet communication network is connected between a first external network and a second external network. The packet communication network includes a classifier, a parallel network that includes a plurality of physically or logically independent networks, and a multiplexing router. The classifier classifies a packet input from the first external network to one of the networks in the parallel network. Each of the networks in the parallel network transmits the packet to the multiplexing router. The multiplexing router multiplexes a packet received from the networks in the parallel network and outputs the multiplexed packet to the second external network.

26 Claims, 11 Drawing Sheets

U.S. PATENT DOCUMENTS

| | | | |
|---|---|---|---|
| 6,977,932 B1* | 12/2005 | Hauck | 370/392 |
| 7,023,820 B2* | 4/2006 | Chaskar | 370/329 |
| 7,050,403 B2* | 5/2006 | Mononen | 370/252 |
| 7,158,508 B2* | 1/2007 | Abrams et al. | 370/352 |
| 7,486,684 B2* | 2/2009 | Chu et al. | 370/401 |
| 2003/0083078 A1 | 5/2003 | Allison et al. | |
| 2004/0114518 A1* | 6/2004 | MacFaden et al. | 370/230.1 |
| 2004/0252674 A1* | 12/2004 | Soininen et al. | 370/352 |
| 2005/0073953 A1* | 4/2005 | Kekki | 370/230 |
| 2005/0220107 A1* | 10/2005 | DelRegno et al. | 370/392 |

FOREIGN PATENT DOCUMENTS

| | | |
|---|---|---|
| JP | 2000-261499 | 9/2000 |
| JP | 2000 324177 | 11/2000 |
| JP | 2001 60966 | 3/2001 |
| JP | 2001 197110 | 7/2001 |
| JP | 2002-518952 | 6/2002 |
| JP | 2002 261817 | 9/2002 |
| JP | 2003 163687 | 6/2003 |
| WO | WO 99/66736 | 12/1999 |
| WO | WO 02/05514 A1 | 1/2002 |

* cited by examiner

| PACKET LENGTH | DEFAULT CLASSIFICATION DESTINATION | CLASSIFICATION DESTINATION DURING CONGESTION |
|---|---|---|
| 200 BYTES | N1 | N3 |
| 128 BYTES OR LESS | N2 | N3 |
| OTHERS | N3 | N3 |

PACKET COMMUNICATION NETWORK AND PACKET COMMUNICATION METHOD

TECHNICAL FIELD

The present invention relates to a packet communication network and a packet communication method for executing packet communication between a plurality of external networks.

BACKGROUND ART

Currently the following method is known as a method for controlling a communication quality for every service in a packet communication network such as the Internet. The method includes temporarily queuing packets in a queue when relaying packets from by a router or the like, and controlling a rate or timing for fetching the packets from the queue. Examples of this control method include a method based on DiffServ that is normally incorporated into a TCP/IP (see Patent Document 1).

Another method is known for controlling an absolute band allocation amount while securing a communication quality to some extent by preparing a plurality of paths different in quality to a single destination in a network, e.g., a shortest-distance path and a bypass path, and by preferentially using one of the paths according to a service (see Patent Document 2).

Patent Document 1: Japanese Patent Application Laid-open No. 2001-197110

Patent Document 2: Japanese Patent Application Laid-open No. 2001-60966

DISCLOSURE OF INVENTION

Problem to be Solved by the Invention

However, in the method based on DiffServ or the like, the packets classified in the router for every service class are returned to one communication path at an output of the router so that it is, therefore, necessary to perform the same process in each router. Further, with this method, only each point of the packet transfer is managed so that although a band can be relatively preferentially controlled for every service, it is difficult to control an absolute communication quality on an end-to-end basis.

In the method that uses a plurality of paths, if the number of paths to be handled is large, management of the paths becomes complicated. Such complication arises from the fact that because the network is shared among the paths, it is difficult to ensure independence of each path necessary for quality control.

Means for Solving Problem

To solve the above problems, according to an aspect of the present invention, as shown in FIG. 1, a packet communication network that is connected to a first external network U1 and a second external network U2, and that executes packet communication between the first external network U1 and the second external network U2, the packet communication network including a parallel network 1 constituted by a plurality of any one of physically and logically independent networks N1, N2, . . . , Nm; at least one classifier 2 that is connected to the first external network U1 and to each of the networks N1 to Nm in the parallel network 1, and that classifies a packet received from the first external network U1 to one of the networks N1 to Nm in the parallel network 1; and at least one multiplexer 3 that is connected to each of the networks N1 to Nm in the parallel network 1 and to the second external network U2, that multiplexes packets received from a plurality of networks N1 to Nm in the parallel network 1, and that outputs multiplexed packet to the second external network U2.

The external network is an expression on the premise that the entire packet communication network according to the present invention constituted by the parallel network 1, the classifier 2, and the multiplexer 3 is considered as an internal network. The external network, therefore, represents a network of an end user (user network) in the packet communication. A minimum unit of the external network is an (one) apparatus such as a computer, a server or an IP telephone including a packet communication function.

With this constitution, a network dedicated to a service that needs an absolute quality control on an end-to-end basis such as a telephone service. In addition, a packet communication can be held for the service while minimizing an influence of traffic related to the other services. During this packet communication, it suffices to perform only packet transfer according to a destination in each network, and a special process and management are unnecessary.

In the packet communication network according to another aspect, the classifier classifies a packet according to a feature amount of a form of the packet.

With this constitution, it is possible to make a classification determination at high rate when the packet from the external network is classified to one of the networks.

In the packet communication network according to another aspect, the feature amount is a packet length of the packet.

With this constitution, a typical VoIP voice packet at a packet length of 200 bytes and a DNS packet at a packet length equal to or smaller than 128 bytes can be easily determined at high rate, and classified.

In the packet communication network according to another aspect, the classifier classifies a packet according to a feature amount of contents of the packet.

With this constitution, it is possible to further ensure making a classification determination when the packet from the external network are classified to one of the networks.

In the packet communication network according to another aspect, the feature amount is a DiffServ code point of an IP packet.

With this constitution, classification such as preferentially processing packets according to a desire of a packet sender can be performed.

In the packet communication network according to another aspect, the feature amount is any one of a protocol number of an IP packet, a destination port number of a UDP packet, and a destination port number of a TCP packet.

With this constitution, a camouflage packet from a malicious sender can be eliminated.

In the packet communication network according to another aspect, the classifier classifies the packet according to a time series change in a sum of data amounts of packets having an equal feature amount.

With this constitution, even if a large amount of traffic occurs to a specific network in the parallel network, it is possible to prevent degradation of quality.

In the packet communication network according to another aspect, the classifier includes a detector that detects a status of traffic of each of the networks in the parallel network, and classifies a packet according to the status of the traffic.

With this constitution, the packet communication that makes effective use of network resources can be held.

In the packet communication network according to another aspect, the networks in the parallel network are logically grouped into a plurality of groups so that each of the group includes a plurality of networks that are physically same.

With this constitution, the packet communication can be applied to a packet communication among external networks among which a plurality of physically independent networks are not present.

In the packet communication network according to another aspect, each of the groups include a unit that dynamically changes an allocation of bands to each of the networks in the group.

With this constitution, a quality of an important packet can be maintained even if a large amount of traffic occurs.

In the packet communication network according to another aspect, the multiplexer preferentially processes a packet received from a specific one of the networks in the parallel network.

With this constitution, even if a sum of bandwidths of the respective networks in the parallel network is larger than that of a communication path to the external network, the packet from the specific network can be preferentially processed.

In the packet communication network according to another aspect, the multiplexer preferentially processes a packet having a predetermined feature amount.

With this constitution, the packet having a predetermined feature amount can be preferentially processed even if the packet makes a detour to the other network due to congestion or the like of the network through which the packet is originally transmitted.

Effect of the Invention

According to the present invention, by performing a classification process for classifying the packet to one of a plurality of networks, the communication equality can be controlled on an end-to-end basis without the influence of the other service traffic.

By performing the classification process, the types of packets to be transferred to the network can be narrowed down. It suffices, therefore, to perform a packet transfer process based only on a destination in each network. A conditional branching process or the like can be simplified accordingly.

Figure 1:
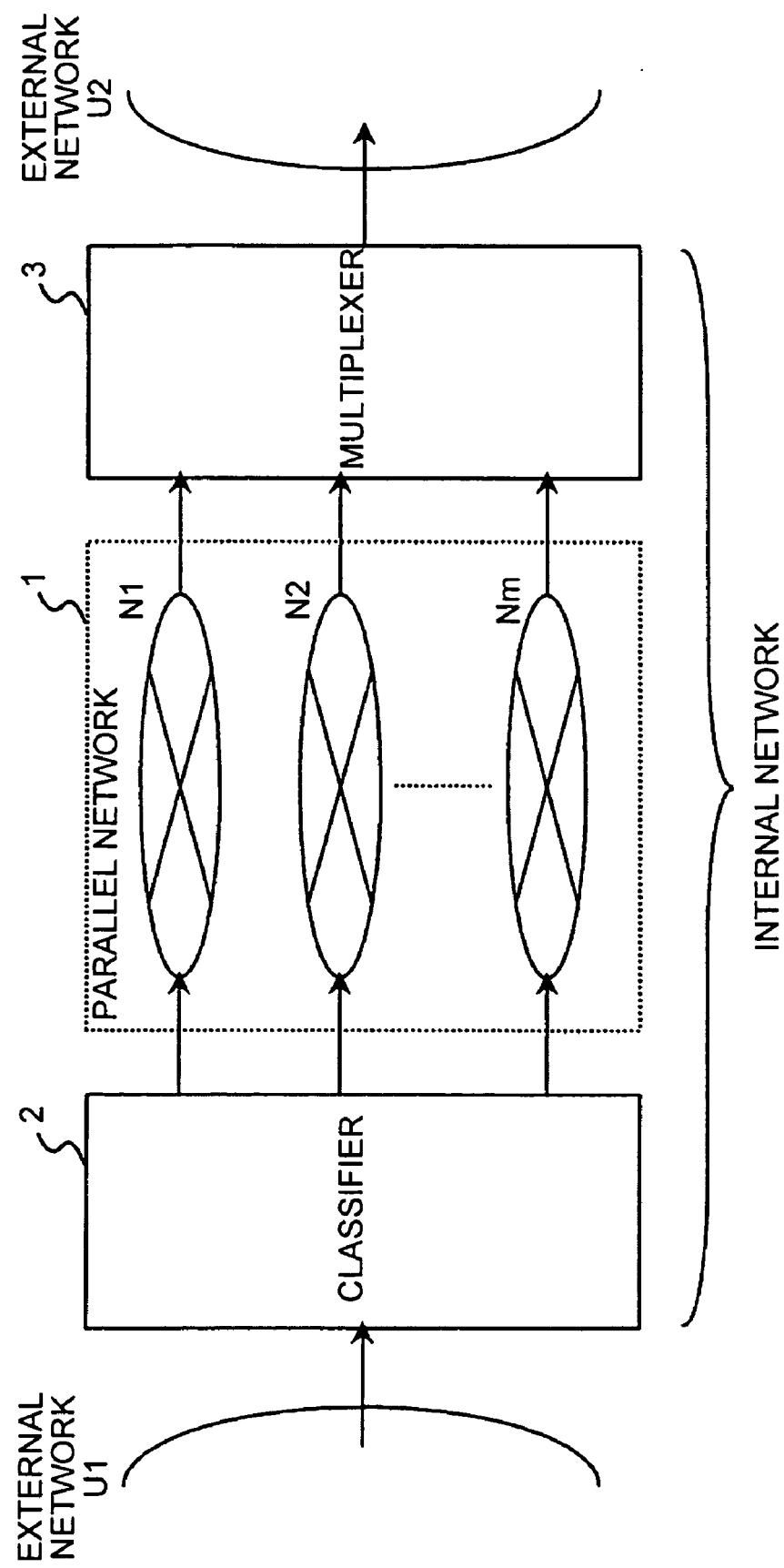
FIG. 1 is a block diagram of a schematic configuration of a packet communication network according to the present invention.

EXPLANATIONS OF LETTERS OR NUMERALS 1, 11, 23, 31 Parallel network
2 Classifier
3 Multiplexer
12, 32 Classifying router
13, 25, 33 Multiplexing router
14, 34 Packet length detector
15-1 to 15-3 Congestion detector
16, 35 Classifying processor
21, A, B, C, D, E, Node
22, 22a, 22b Communication path
24 TDM processor
M1, M2 Management terminal
N1, N2, ... Nm, N11, N12, N21, N22, N31, N32, Network
P, Q, R Fully meshed WDM optical network
U1, U2 External network

BEST MODE(S) FOR CARRYING OUT THE INVENTION

Embodiments of the present invention will be explained below with reference to the accompanying drawings.

First Embodiment

Figure 2:
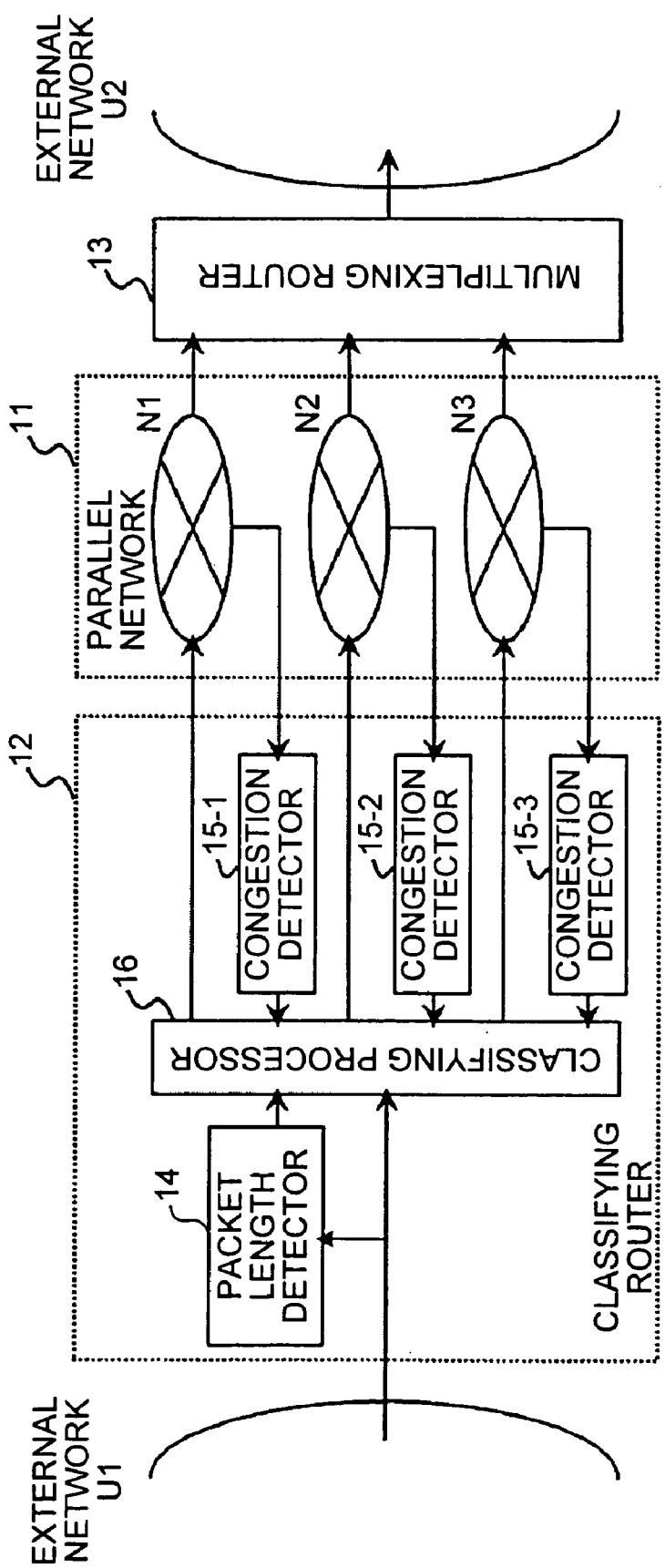
FIG. 2 is a block diagram of a packet communication network according to a first embodiment of the present invention.

FIG. 2 is a block diagram of a packet communication network according to a first embodiment of the present invention. In FIG. 2, reference numeral 11 denotes a parallel network, 12 denotes a classifying router, 13 denotes a multiplexing router, and U1 and U2 denote external networks.

The parallel network 11 includes three physically independent parallel networks N1, N2, and N3.

The classifying router 12 is connected to one external network, which is the external network U1 in this embodiment, and also connected to the respective networks N1, N2, and N3 in the parallel network 11. The classifying router 12 classifies a packet received from the external network U1 to one of the networks N1, N2, and N3 in the parallel network 11.

The multiplexing router 13 is connected to the respective networks N1, N2, and N3 in the parallel network 11, and also connected to one external network, which is the external network U2 in this embodiment. The multiplexing router 13 multiplexes packets received from the networks N1, N2, and N3 in the parallel network 11 and outputs the multiplexed packet to the external network U2.

In this embodiment, only one classifying router and only one multiplexing router are employed because there is one input external network U1 and one output external network U2. Generally, if there are more input external networks, then as many classifying routers are required as the number of the input external networks, and if there are more output external networks, then as many multiplexing routers are required as the number of the output external networks. For simplifying explanation, a case that only one input external network only one output external network will is explained below. Generally, one external network is connected to the parallel network through both of the classifying router and the multiplexing router (or to one router including classification and multiplexing functions) so that it is possible to hold a bidirectional communication. Further, one classification/multiplexing router can perform the classification and multiplexing process on a plurality of external networks. It is not always required to provide as many classification and multiplexing routers as the external networks. Although not shown in FIG. 2, each of the networks that constitute the parallel network can include a switching unit such as a router. Each network can also include a classifier, a parallel network, and a multiplexer inside.

In this embodiment, the case that the packet is transferred from the external network U1 to the external network U2 is shown. A constitution and an operation of the packet communication network according to this embodiment will now be explained in more detail.

As usage of each network in the parallel network 11, it is assumed herein that the network N1 is a dedicated VoIP network, the network N2 is a dedicated narrowband network, and that the network N3 is a dedicated broadband network. It is also assumed herein that the packet is an IPv4 packet.

Figures 3, 4:
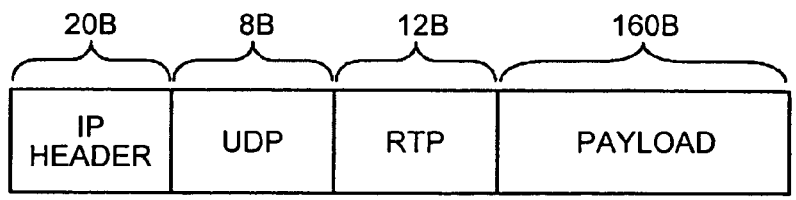
FIG. 3 is an explanatory view of an example of classification rules followed by a classifying router.
FIG. 4 is an explanatory view of a data structure of a VoIP voice packet.

FIG. 3 is a table of one example of classification rules followed by the classifying router 12. The classifying router 12 determines a classification destination according to a packet length, which is one of feature amounts of a form of the packet, under this rule.

A 200-byte packet is classified to the VoIP network N1 in FIG. 3 for the following reason. For a typical VoIP voice packet obtained by packeting a voice using a G.711 codec and an RTP (Realtime Transport Protocol) for every 20 milliseconds, an entire length of the packet including a header is 200 bytes, as shown in FIG. 4.

According to statistics, more than half of packets transmitted and received over the Internet are short packets equal to or smaller than 128 bytes. The statistics can be referred to in MAWI working group of WIDE project (http://www.wide.ad.jp/wg/mawi/index-j.html) or the like.

Since the short packets include many DNS packets, it is desirable to process the short packets at high rate. For these reasons, the packets at lengths equal to or smaller than 128 bytes are classified to the dedicated narrowband network N2. The remaining packets are all classified to the dedicated broadband network N3.

The classification rule shown in FIG. 3 also specifies destinations when the networks N1 to N3 are congested. If the networks N1 and N2 are congested, the packets difficult to classify to the networks N1 and N2 are detoured to the network N3. However, even when the network N3 is congested, the packets are not detoured to the network N1 or N2.

In order to perform this process, the classifying router 12 is constituted by a packet length detector 14, congestion detectors 15-1, 15-2, and 15-3, and a classifying processor 16.

The packet length detector 14 detects a packet length of an input packet, and notifies the classifying processor 16 of the detected packet length. A packet length detecting method differs according to a type of the packet. Since the packet type is described in an IP header of an IP packet, the packet type can be read when determining the detecting method.

The congestion detectors 15-1, 15-2, and 15-3 detect congestions of the networks N1, N2, and N3, respectively, and notify the classifying processor 16 of the detected congestions. As a congestion detecting method, the following two methods are normally known. With a first method, it is detected that a network is congested if data overflows a buffer (not shown) when data classified by the classifying processor 16 is temporarily stored in the buffer. With a second method, it is detected that a network is congested according to a probability that an echo response is obtained from the multiplexing router 13 within a certain time after an echo request packet is transmitted to the multiplexing router 13 or according to a delay time generated until the echo response is obtained from the multiplexing router 13 in the certain time since the echo request packet is transmitted to the multiplexing router 13. A protocol for the latter method is specified as an ICMP echo protocol in the IP. In this embodiment, an arbitrary one of the two methods can be used.

Figure 5:
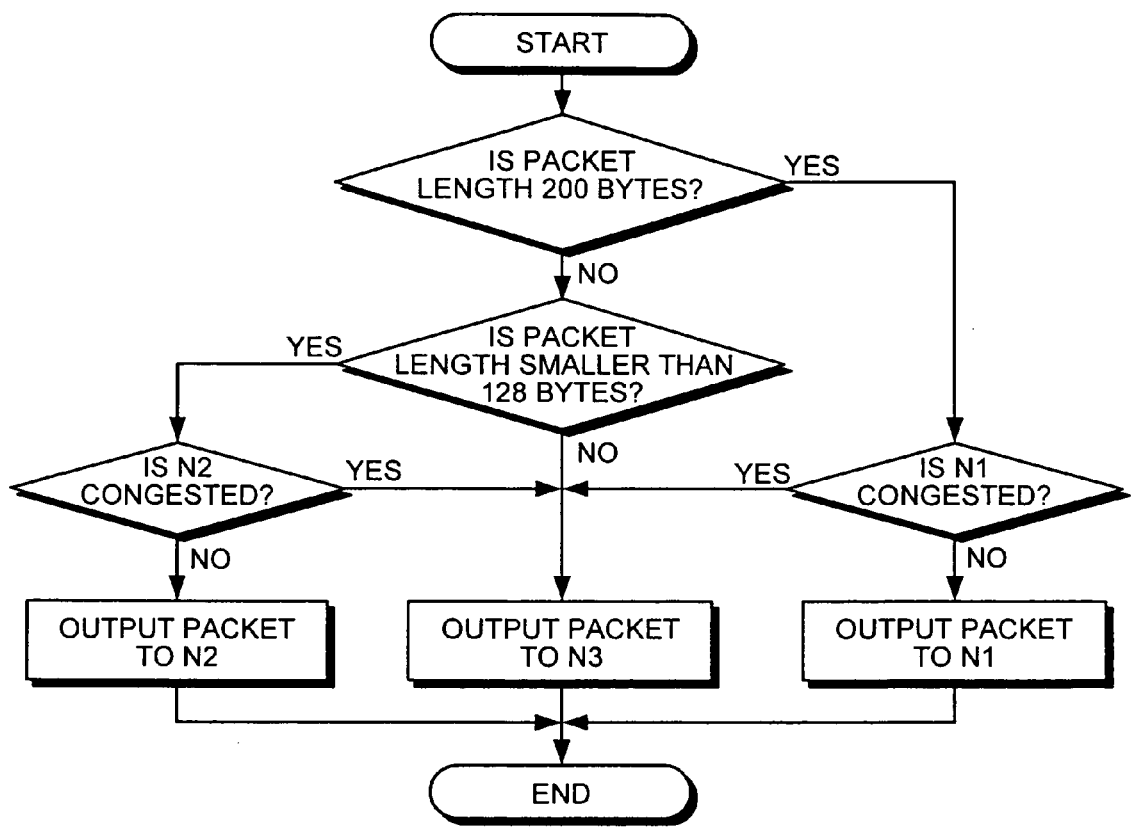
FIG. 5 is a flowchart of a process performed by the classifying processor.

The classifying processor 16 execute an actual classification process according to the classification rule shown in FIG. 3 based on information from the packet length detector 14 and the congestion detectors 15-1 to 15-3. FIG. 5 is a flowchart of a process performed by the classifying processor 16.

A packet arriving at the multiplexing router 13 through the parallel network 11 is multiplexed again by the multiplexing router 13, and output to the external network U2.

If a plurality of unprocessed packets are present, the multiplexing router 13 preferentially processes the packets in order of N1, N2, and N3. It is noted, however, the packets arrive at the multiplexing router 13 from a plurality of transmission sources. Due to this, if (a bandwidth of the network N1)+(a bandwidth of the network N2)+(a bandwidth of the network N3) is larger than a bandwidth of a communication path to the external network U2, the multiplexing router 13 often cannot perform the multiplexing process. In this case, by using a packet scheduling algorithm such as WFQ (Weighted Fair Queue), the multiplexing router 13 can preferentially process the arrival packets.

As explained so far, in the packet communication network according to the first embodiment, the dedicated networks are provided for the 200-byte packets and the packets at lengths equal to or smaller than 128 bytes, respectively. Therefore, these packets can be transferred preferentially to the other packets. It is, therefore, advantageously possible to improve delays in a VoIP voice and a DNS search and a packet loss. In addition, if a video telephone service is used in this packet communication network, then a voice is classified to the network N1 and a video is classified to the network N3. It is thereby advantageously possible to prevent the voice from being broken off and a conversation from being adversely influenced by the breaking of the voice even if the video is subjected to a frame missing during a congestion of the network concerned.

Meanwhile, according to this embodiment, the classification process is performed by detecting only the packet length of each packet. For this reason, if a malicious originator transmits a large quantity of 200-byte packets to the packet communication network, the network N1 can possibly be intentionally congested.

To deal with such a problem, measures for determining a classification destination according to a feature amount of a content of the IP header of each IP packet can be considered. Namely, to improve a security of the dedicated VoIP network, for example, one of the following methods and the like can be used. It is confirmed whether a packet is a UDP packet by referring to a protocol field in the IP header of the packet. It is confirmed whether a destination port number is within a preset range by referring to a UDP header. It is confirmed whether a payload type is a voice by referring to an RTP header subsequent to the UDP header.

Alternatively, to enable each VoIP terminal to discriminate a VoIP packet from the other packets, a user sets a specific value to a service type field in the IP header, and the packet is classified according to the set value. By thus the user designating a classification parameter in advance, it is considered to be advantageously possible to hold a communication between a plurality of VoIP terminals owned by the user with different priorities set to the respective VoIP terminals, or hold a communication with different priorities set thereto according to communication destination addresses.

Further, it is confirmed whether a pair of a transmission source address and a destination address as well as a destination port number of an IP packet are equal to a pair of IP addresses between which a conversation is held according to the VoIP protocol. If it is not so confirmed for a packet, the packet is classified to the network N3. To grasp the pair of IP addresses between which the conversation is held according to the VoIP protocol and the destination port number, information on a negotiation made using a VoIP session control protocol such as a SIP (Session Initiation Protocol) prior to start of a communication of voice data can be used.

For instance, according to the SIP, a communication can be initiated if a called side transmits an OK in response to an INVITE message from a caller side and the caller side transmits ACK to the called side. An IP address and a port number of the caller side and those of the called side are transmitted or received between the caller side and the called side over a SIP message. Since a SIP proxy server relays this message, the SIP proxy server can grasp the IP addresses and port numbers of the caller side and the called side. The SIP proxy server can also detect an end of the session by observing transmission and reception of a BYE message according to the SIP. Therefore, if the SIP proxy server notifies the classifying router of a start and an end of the voice data communication together with the IP addresses and port numbers of the caller side and the called side, the classifying router classifies only packets having IP addresses and port numbers compatible with those notified by the proxy server to the dedicated VoIP network. It is thereby possible to eliminate camouflage packets from a malicious originator. Likewise, if a dedicated server connected to the classifying router by a network notifies the router of information (hereinafter, "signature") for identifying malicious packets such as those of a virus, a worm, and a DoS attack, these malicious packets can be eliminated.

Furthermore, the server can notify the router of not packet information but network information. For instance, if the server notifies the router of a charge for using each network, it is possible to automatically select a least cost network at that moment similarly to an LCR for an analog telephone line.

In this embodiment, the respective networks that constitute the parallel network are physically independent of one another. Alternatively, the networks can be obtained by logically dividing one physical network and making the divided networks independent of one another. If the parallel network is constituted by networks that are independent not physically but logically, an existing technique such as VLAN, VPN, or tunneling can be used. The parallel network can be constituted by using a time division multiplexing technique or a wavelength multiplexing technique for an optical communication.

The networks that constitute the parallel network can be either equivalent to one another or optimized according to features of the packets classified to the respective networks.

For a network that transfers only a VoIP voice stream, for example, the stream can be often transferred more efficiently by MPLS (Multi-Protocol Label Switching). If so, in the network that transfers only the VoIP voice stream, an LSP (Label Switched Path) is set at a start of the stream. Thereafter, a process for allocating an MPLS tag to each packet at an entrance of the network and for removing the tag at an exit thereof is performed.

Alternatively, even if a stream is the VoIP voice stream, it is preferable to preferentially process a VoIP voice stream of an emergency call such as 110 or 119. This process can be realized by causing a packet originator to allocate necessary priority order information such as a DiffServ code point to a packet of the emergency call using, for example, a quality control technique such as DiffServ in the VoIP network.

Alternatively, totally different networks can be used according to types of data. For instance, VoIP control data is transferred using a control line signal network in a conventional telephone network, and voice data is transferred using an IP network.

In this embodiment, the network N2 transfers only the packets having short data lengths. To improve processing efficiency of the network N2 for the short packets, the router in the network N2 accelerates a processing rate for a packet header of each packet and has a relatively low throughput for data transfer. By doing so, cost reduction can be realized.

Conversely, if a dedicated network is prepared for WWW, email, and the like for which it is not always necessary to ensure transferring information at real time but necessary to ensure transferring relatively a large capacity of information, a storage server such as a cache server is included in the dedicated network. By doing so, it is possible to constitute the network that can ensure transferring data at low cost.

If video and voice are broadcast, then a network that can efficiently perform multicast delivery using a loop topology network configuration or a cable television network configuration is constituted so as to improve band utilization efficiencies of the other networks.

Second Embodiment

A packet communication network in which a parallel network is constituted by fully meshed wavelength division multiplexing (WDM) optical networks, according to a second embodiment of the present invention will next be explained. The packet communication network according to this embodiment is equal in logical configuration to that shown in FIG. 1. Differently from FIG. 1, the number of networks that constitute the parallel network is two.

Figure 6:
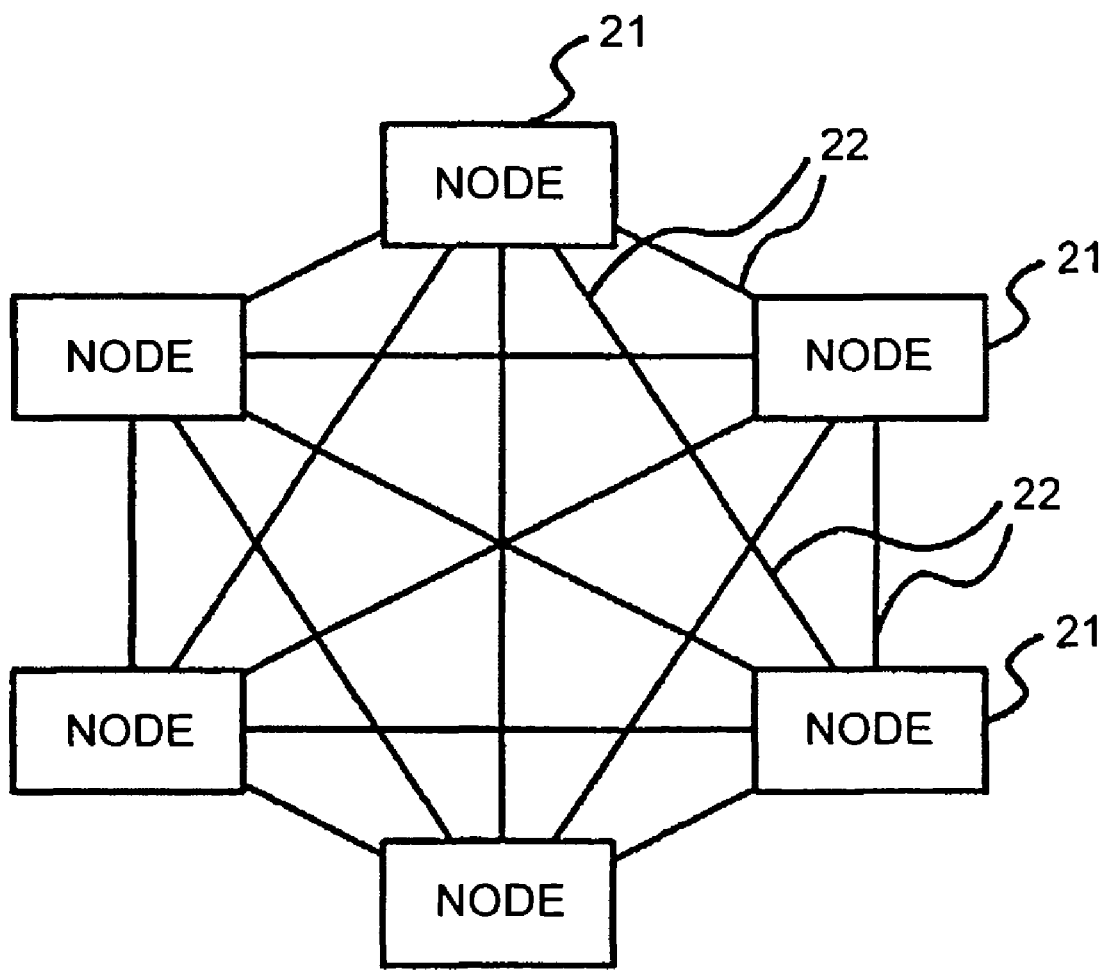
FIG. 6 is a logic block diagram of a fully meshed wavelength division multiplexing optical network.

FIG. 6 is a block diagram of a logical configuration of the fully meshed WDM optical network. In the network, each node 21 is connected to the other nodes 21 through independent communication paths 22, respectively. The network of this type can be constituted using an optical cross connect apparatus and a wavelength division multiplexing technique (see, for example, Kenichi Sato and Masahumi Koga, "Broadband Optical Networking Technique", The Institute of Electronics, Information and Communication Engineers, 2003).

In the fully meshed WDM optical network, the nodes 21 are connected to one another by lights having different wavelengths. If n wavelengths are allocated for all the communication paths 22 among the nodes 21, it is possible to easily constitute n parallel networks in the fully meshed WDM optical network.

Actually, however, the number of wavelengths which one optical fiber can use has an upper limit, and the fully meshed WDM optical network needs many wavelengths per se. Therefore, in this embodiment, an instance of a method for creating a parallel network using time division multiplexing (TDM) as another parallel network creating method will be explained.

In the fully meshed WDM optical network, the communication path 22 not via the other nodes 21 is basically present between a pair of arbitrary nodes 21. Accordingly, each communication path 22 is always constant in bandwidth.

Figure 7:
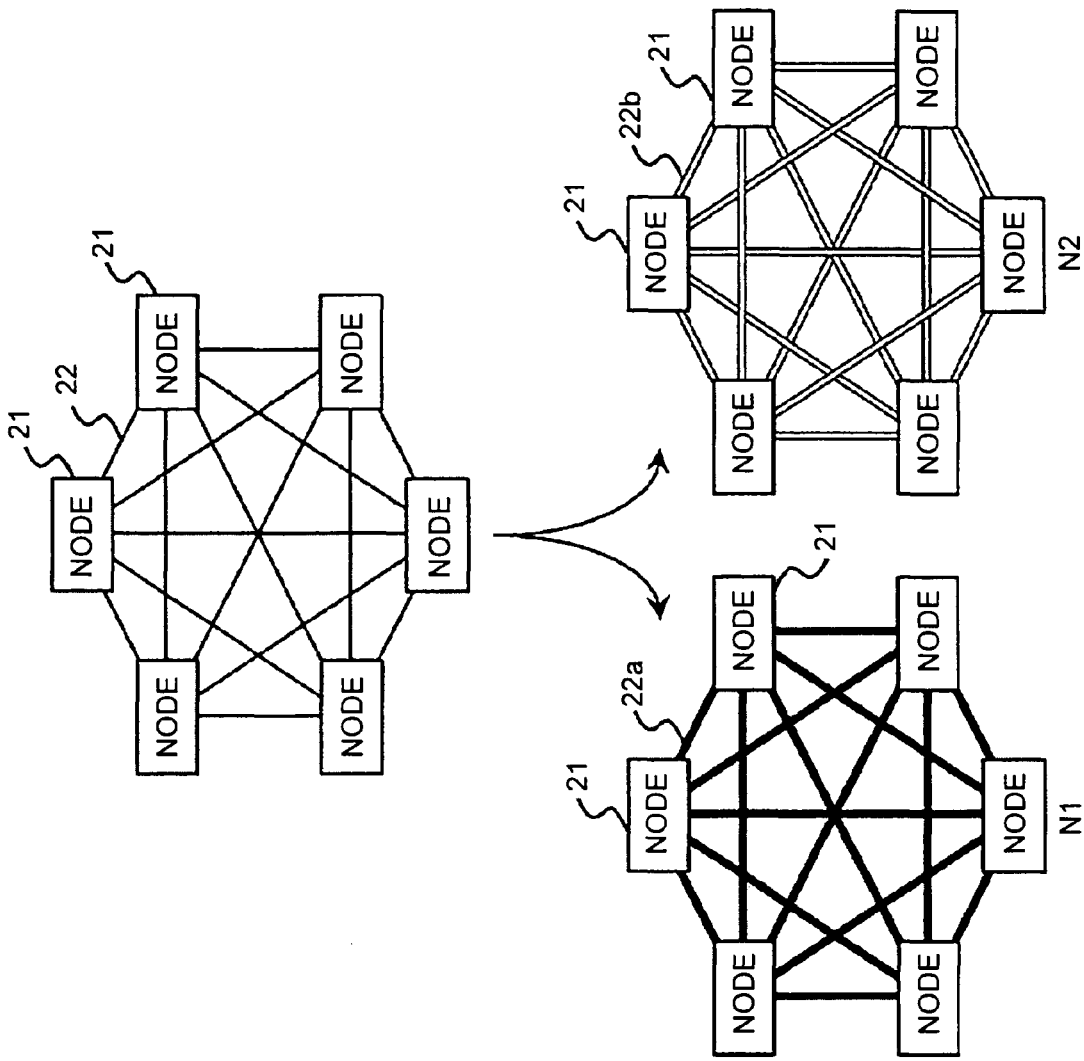
FIG. 7 is an explanatory view of a parallel network including the fully meshed wavelength division multiplexing optical networks.

The networks N1 and N2 each configured by reserving a constant bandwidth as shown in FIG. 7A using the time division multiplexing technique shown in FIG. 7B for all the communication paths 22 will now be considered (see FIG. 7C). The network N1 is configured so that the nodes 21 are connected to one another by communication paths 22a each having the reserved bandwidth. The network N2 is configured so that the nodes 21 are connected to one another by communication paths 22b each having a remaining bandwidth.

As explained above, the bandwidth of the communication path for a pair of arbitrary two nodes is independent of the other communication paths. Due to this, even if the bandwidth of whichever communication path is divided, the other communication paths are not influenced by the division. It is, therefore, possible to consider that the two networks N1 and N2 are independent, parallel networks configured so that the bandwidth used by one network N1 or N2 does not influence the bandwidth available for the other network N2 or N1.

Figure 8:
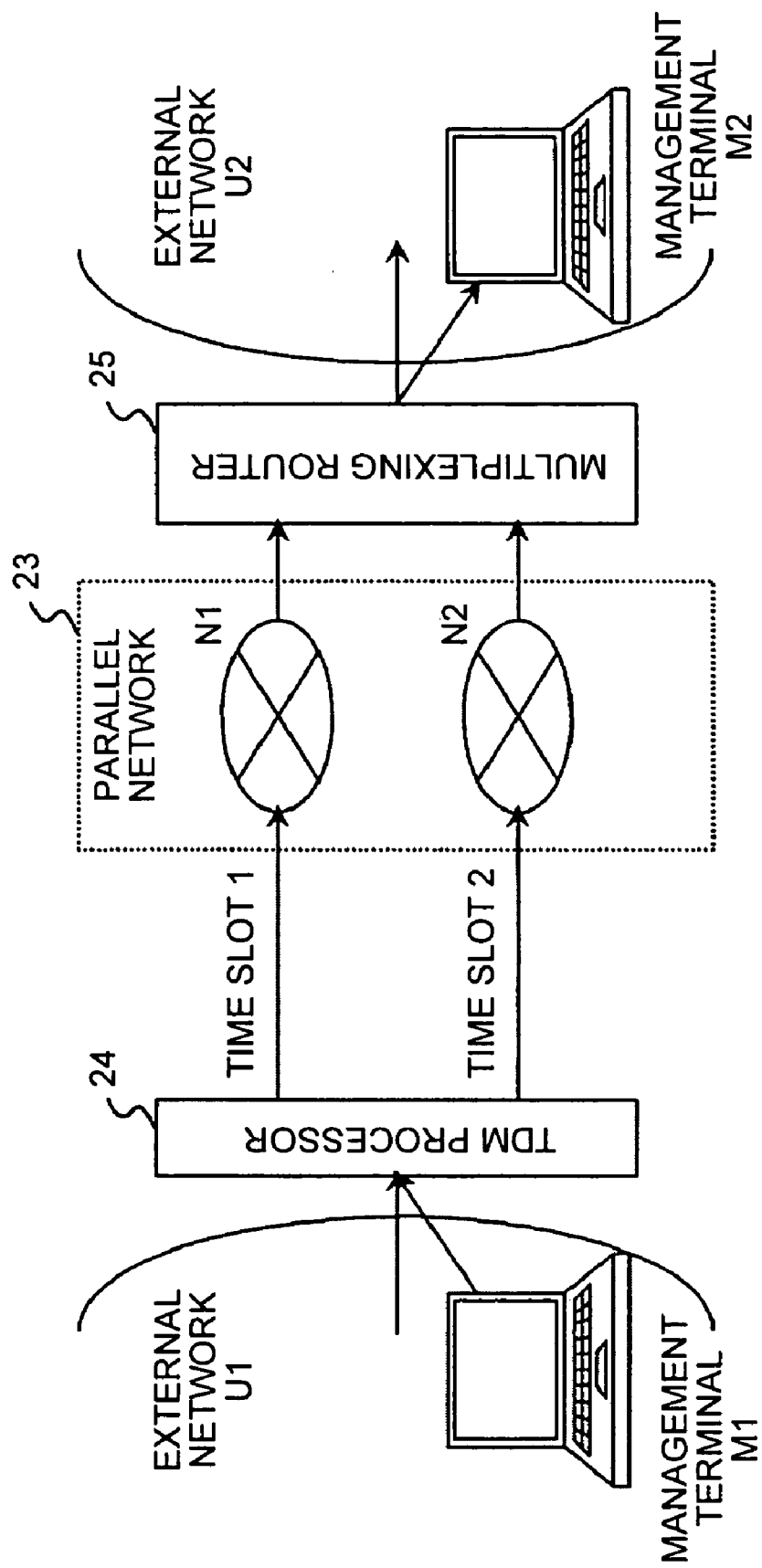
FIG. 8 is a block diagram of a packet communication network according to a second embodiment of the present invention.

FIG. 8 is a block diagram of the packet communication network according to the second embodiment of the present invention. Specifically, FIG. 8 depicts a case that the packet communication network employs the parallel network constituted by the fully meshed WDM optical networks. In FIG. 8, reference numeral 23 denotes the parallel network, 24 denotes a TDM processor (classifier), 25 denotes a multiplexing router, and U1 and U2 denote external networks.

Out of the two networks N1 and N2 that constitute the parallel network, the network N1 is used by a network administrator for managing the network, and the network N2 is used by a user.

As explained above, the external networks U1 and U2 are user networks, and network management terminals M1 and M2 are present in the respective external networks U1 and U2. It is assumed herein that the user networks U1 and U2 and the network management terminals M1 and M2 differ in address system. Therefore, it is assumed to be possible to discriminate whether a packet is a packet transmitted from the user terminal U1 or U2 or from the network management terminal M1 or M2 based on an address of the packet. Each of the network management terminals M1 and M2 can be the management target TDM processor or the multiplexing router.

A packet from the user network U1 or U2 and that from the network management terminal M1 or M2 are input to the TDM processor 24 in a mixed state or independently of each other. The TDM processor 24 outputs the input packets to different paths according to their respective destinations. At that time, the TDM processor 24 classifies the packet transmitted from the network management terminal M1 or M2 to a time slot corresponding to the network N1. In addition, the TDM processor 24 classifies the packet transmitted from the user terminal U1 or U2 to a time slot corresponding to the network N2.

The multiplexing router 25 multiplexes the packets arriving from (the time slots corresponding to) the networks N1 and N2. At that time, the multiplexing router 25 discards the packets destinations of which are addresses of the user networks U1 and U2 via the network N1 and those destinations of which are addresses of the network management terminals M1 and M2 via the network N2. This discarding process can be performed by the TDM processor 24 in place of the multiplexing router 25.

As explained so far, the packet communication network using the fully meshed WDM optical networks according to the second embodiment of the present invention includes the network N1 dedicated to the network management and independent of the network N2 used by the user. Therefore, even if a failure such as a congestion occurs to the network N2 used by the user, it is advantageously possible to perform a management operation via the network N1. In addition, even if a part of the paths of the networks are unavailable due to a disaster or the like, it is advantageously possible to create a detour path only for the network management network N1 and to use the detour path.

In this embodiment, the parallel network is constituted by dividing the fully meshed WDM optical network by the time division multiplexing process. Therefore, by changing lengths of the time slots corresponding to the respective networks N1 and N2, the bandwidths of the networks N1 and N2 can be changed. To change the bandwidths, it is necessary to notify both the TDM processor 24 and the multiplexing router 25 of the time slot lengths. The notification can be made through the network management terminals M1 and M2.

Third Embodiment

Figure 9:
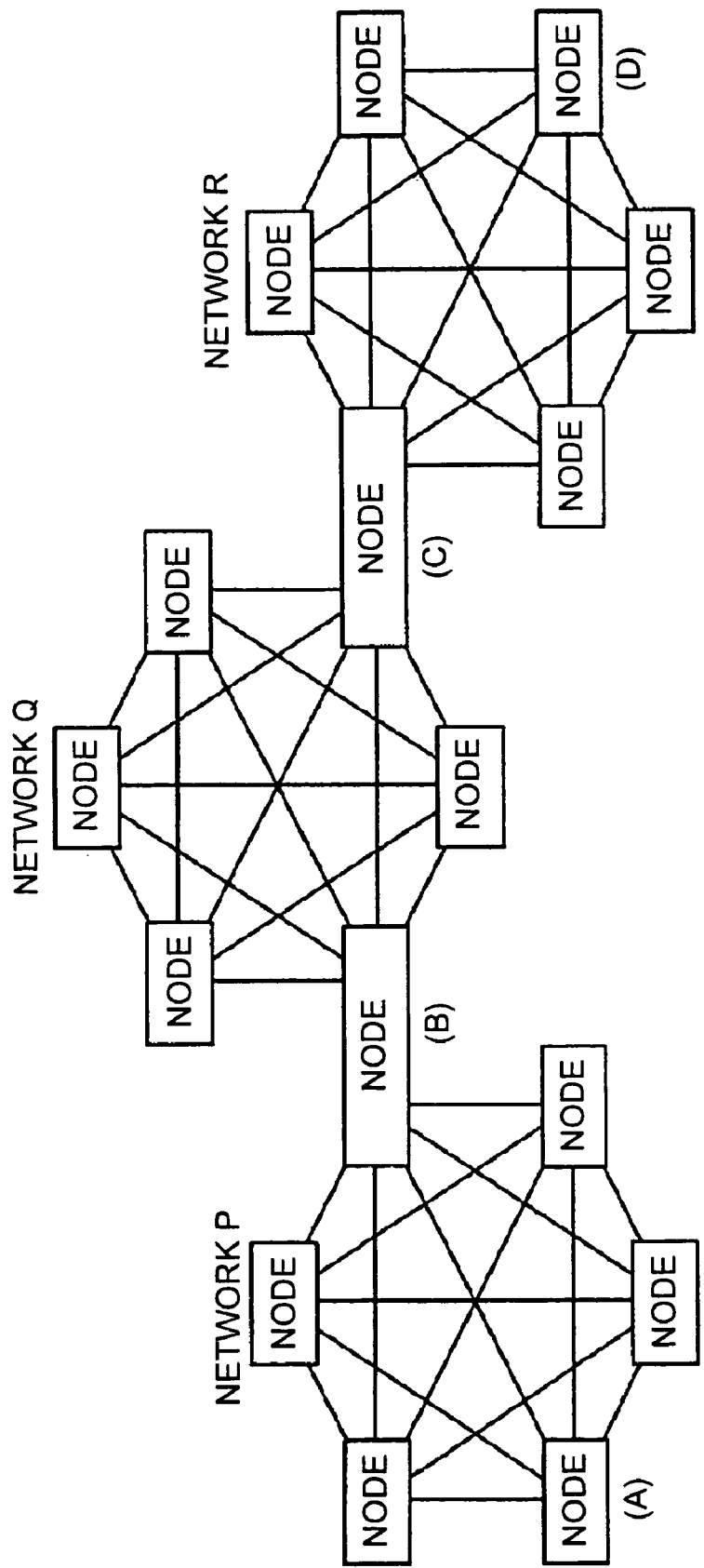
FIG. 9 is a block diagram of a network in which multiple fully meshed wavelength division multiplexing optical networks are connected.

A packet communication network in which that a parallel network is constituted by connecting a plurality of fully meshed WDM optical networks to one another at multiple stages as shown in FIG. 9 according to a third embodiment of the present invention will be explained. These multiple-stage network is a network in which the fully meshed WDM optical networks shown in FIG. 6 are connected to one another in the form of a tree.

For brevity, FIG. 9 is an example of the configuration of the parallel network in which three fully meshed WDM optical networks P, Q, and R are connected to one another. Specifically, FIG. 9 is an example of a two-stage configuration in which the fully meshed WDM optical network Q is located at a higher position, and in which the two other fully meshed WDM optical networks P and R are connected to the network Q. Alternatively, one or more networks can be connected to one another for each node of the network Q. In addition, the other network can be connected to the network Q at a lower position than the positions of the networks P and R or at a higher position than the position of the network Q.

A method for constituting the parallel network by dividing the multiple-stage network into a plurality of parallel networks will be explained.

If the networks P and R are fully meshed WDM optical networks as explained in the second embodiment, a communication without via the network Q in FIG. 9, i.e., a communication between the nodes in the network P or R is not so different from the communication according to the second embodiment. In this embodiment, therefore, a case that the parallel network is constituted for a communication via the network Q such as a communication between nodes (A) and (D) in FIG. 9 will be considered.

As explained in the second embodiment, the communication path that connects a pair of node is completely independent of the other communication paths in the fully meshed WDM optical network. Therefore, only the communication paths via the network Q among those shown in FIG. 9 are those as shown in FIG. 10.

Figure 10:
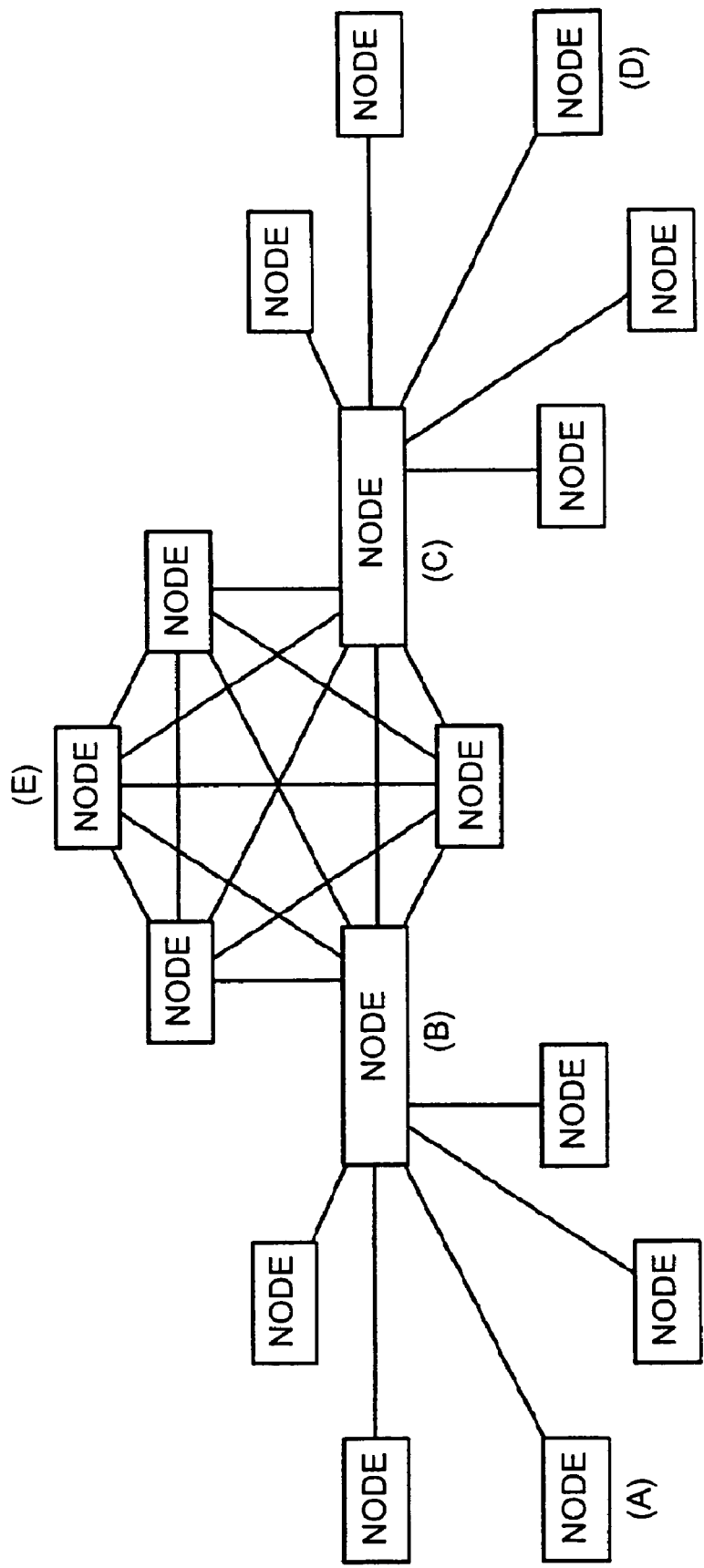
FIG. 10 is a block diagram of a network in which the multiple networks shown in FIG. 9 are integrated into networks constituted only by communication paths passing through a higher network.

As a method for dividing the network shown in FIG. 10 into a plurality of parallel networks, a method using the time division multiplexing as explained in the second embodiment and a method using MPLS are known.

The method using the time division multiplexing will first be explained.

Figure 11:
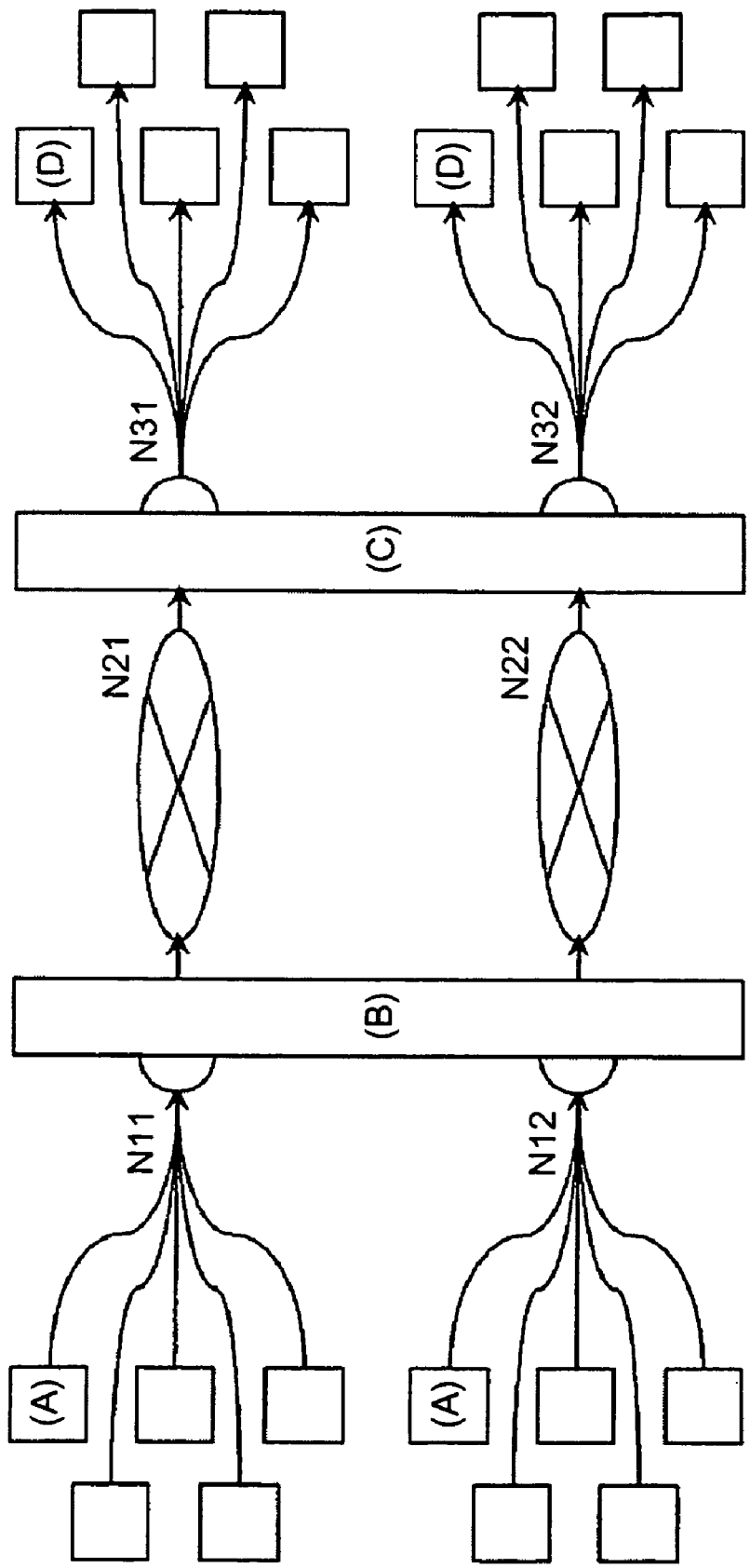
FIG. 11 is an explanatory view of a state where the network shown in FIG. 10 is divided into a plurality of networks using a time division multiplexing technique.

The respective communication paths in the network shown in FIG. 10 can be logically divided into a plurality of networks using the time division multiplexing technique similarly to the second embodiment. Namely, as shown in FIG. 11, the communication paths belonging to the network P can be divided into networks N1 and N12. Those belonging to the network Q can be divided into networks N21 and N22. Those belonging to the network R can be divided into networks N31 and N32.

If nodes B and C are caused to operate so that the networks N11, N21, and N31 are connected in series in FIG. 11 and so that the networks N12, N22, and N32 are connected in series in FIG. 11, the networks N11, N21, and N31 and the networks N12, N22, and N32 can be regarded as two independent networks N11-N21-N31 and N12-N22-N32.

In the networks, it is assumed, for example, that the network N11-N21-N31 is the dedicated VoIP network as explained in the first embodiment, and that the network N21-N22-N32 is a network for the other data. If so, it is possible to constitute the network that preferentially processes VoIP packets. Particularly if a bandwidth of the network N21 is set larger than a sum of bandwidths of the respective communication paths in the network N11 and those of the respective communication paths in the network N31, a band of the network N11-N21-N31 can be secured. Accordingly, the network that ensures a high voice quality according to the VoIP can be constituted.

If the bandwidth of the network N21 is required to be quite large, a method for using the communication paths between the nodes (B) and (C) as those dedicated to the network N21, and for using the communication paths detoured among the nodes (B), (E) and (C) in FIG. 10 for the network N22 can be considered. By adopting this method, if traffic of the communication paths between the nodes (B) and (E) or between the nodes (E) and (C) is not so heavy, these communication paths can be made effective use of.

The method using MPLS will next be explained.

It is assumed that the respective nodes shown in FIG. 10 are MPLS nodes. k LSPs from the node (A) to the node (D) are created. If so, networks connected to the node (D) relative to the node (A) are logically equivalent to (k+1) LSPs including the original network and the k LSPs. Each LSP is not always shortest path between the two nodes (A) and (D) but can be a path through, for example, the nodes (A)-(B)-(E)-(C)-(D) in this order in FIG. 10.

As explained so far, a plurality of parallel networks can be constituted in the fully meshed WDM optical networks connected to one another at multiple stages. If the classifying router and the multiplexing router shown in FIG. 2 are used, it is possible to constitute a network logically equivalent to the network shown in FIG. 1.

The packet communication network in which that fully meshed WDM optical networks connected to one another at multiple stages are divided into a plurality of parallel networks using the MPLS to constitute the parallel network according to the third embodiment of the present invention will be explained.

Figure 12:
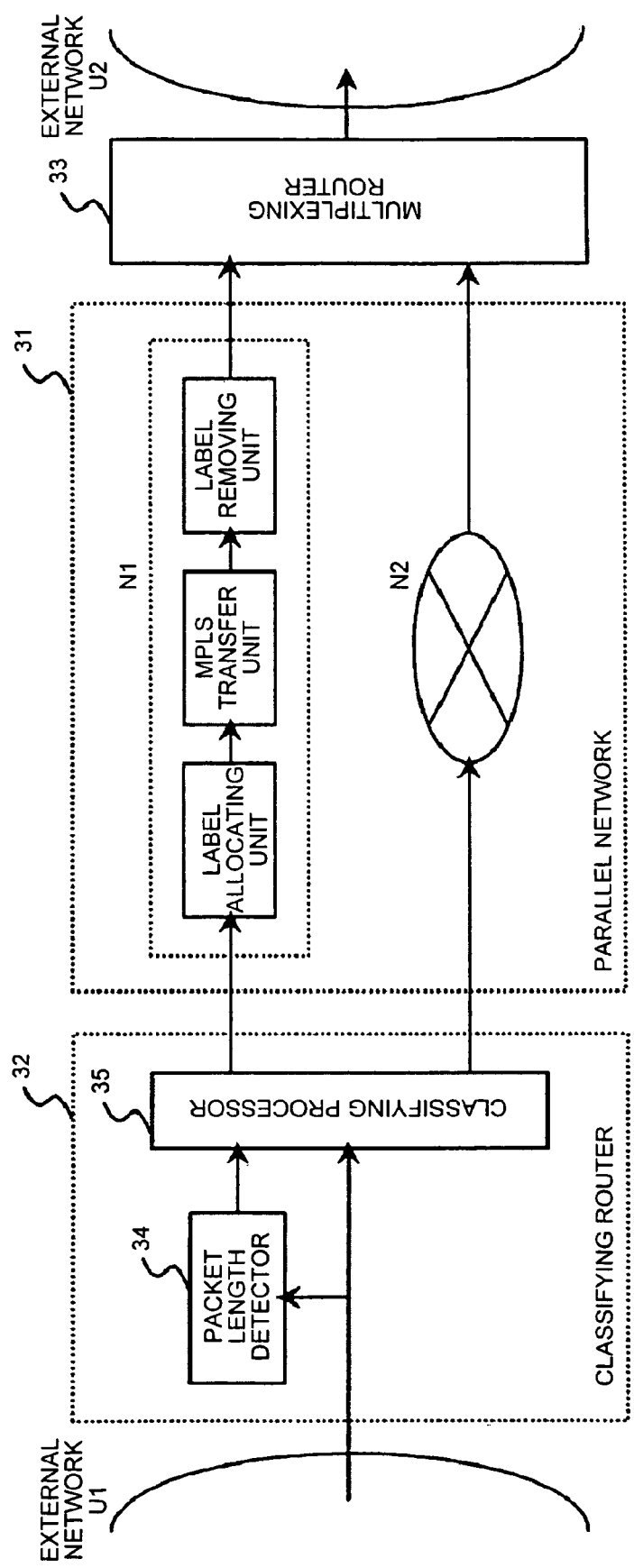
FIG. 12 is a block diagram of a packet communication network according to a third embodiment of the present invention.

FIG. 12 is a block diagram of the packet communication network using the parallel network explained above according to the third embodiment of the present invention. In FIG. 12, reference numeral 31 denotes the parallel network, 32 denotes the classifying router, 33 denotes the multiplexing router, and U1 and U2 denote the external networks.

The parallel network 31 is constituted by the network N1 according to the LSP (where k=1) and the original network N2. It is assumed herein that the network N1 is used as the dedicated VoIP network, and that the network N2 is used as a network for the other packets.

The classifying router 32 is constituted by a packet length detector 34 and a classifying processor 35 similarly to the classifying router according to the first embodiment. The classifying router 32 classifies VoIP packets and the other packets similarly to the first embodiment. Each of the VoIP packets is labeled according to a destination of the packet at an entrance of the network, transferred to a communication partner node in the MPLS network, and unlabeled at an exit of the network. The packets other than the VoIP packets are transferred to the node of the communication partner node through an ordinary path.

The multiplexing router 33 multiplexes the packet similarly to the first embodiment.

In the packet communication network explained so far, the dedicated VoIP network is virtually created by the MPLS. Therefore, by controlling a quality of the MPLS network at each node by DiffServ or the like, a voice quality of each VoIP packet can be improved. In addition, by taking security measures as explained in the first embodiment, it is possible to improve the security of the dedicated VoIP network.

Since the parallel network using the MPLS is not completely independent of the original network in terms of bandwidth, there is a probability that the quality is degraded if heavy traffic occurs to the VoIP network.

To prevent this, it is effective for the classifying processor 35 to change classification destinations of the packets according to a time-series change in a sum of data amounts of the packets. This process will now be explained.

If a data transfer amount of the VoIP packets per unit time exceeds a preset threshold, the classifying processor 35 classifies an excessive amount of packets to the network N2. To measure the data transfer amount, a sum of bytes of data of the VoIP packets transmitted to the classifying processor 35 per unit time is measured. In addition, to select the packets to be classified to the network N2, a fair sharing method such as WFQ based on a source address and a destination address of each packet can be used.

The same method can be used for traffic control over the network other than the VoIP network. For instance, this process is performed on traffic related to P2P file exchange, and excessive packets are not classified to the other parallel network but discarded. By doing so, it is possible to suppress an amount of the traffic related to the P2P file exchange to be equal to or smaller than a constant amount.

Further, the LSP used by one node can possibly be congested due to an influence of traffic of the nodes other than this node. If so, it is necessary to grasp a status of the traffic in the network or that on an end to an end of the LSP. To do so, a method for inquiring about the traffic as well as the two methods explained in the second embodiment can be used. In FIG. 10, for example, the node (A) grasps the traffic between the nodes (A) and (B), the node (B) grasps the traffic between the nodes (B) and (C), and the node (C) grasps the traffic between the nodes (C) and (D). Therefore, if the node (A) inquires about the nodes (B) and (C) about the traffic, the node (A) can grasp the status of the traffic between the nodes (A) and (D).

If this process is performed by the classifying processor 35, the VoIP packet that is originally passed through the network N1 arrives at the multiplexing router 33 while being passed through the network N2. In these circumstances, the multiplexing router 33 performs the preferential process not only on the packet that arrives at the network but also the VoIP packet that arrives at the network N2 by discriminating the packet by the method according to the first embodiment. By doing so, it is possible to suppress the influence of classifying the packet to the network N2 to be low.

Furthermore, the bandwidth of the dedicated VoIP network can be dynamically increased or decreased according to an increase or a decrease of the traffic. If the dedicated network management network as explained in the second embodiment is constructed, the bandwidth of the dedicated VoIP network can be changed by transmitting a command to each node from a management center on the network.

As another method for suppressing a sum of the traffic amounts, VoIP packets from specific users who conclude a service user contract or the like can be classified to the dedicated VoIP network without classifying VoIP packets from all users uniformly to the dedicated VoIP network. In this case, this advantage can be acquired by collating a source address of each packet to that in a service user contract contractor database, and only the packet having the address coincident with that in the database is labeled to indicate the MPLS in the classification process.

If the same framework is applied to a plurality of parallel dedicated VoIP networks provided by a plurality of providers, a service that classifies a VoIP packet from each user to the dedicated VoIP network of the provider with which the user concludes a contract can be realized.

INDUSTRIAL APPLICABILITY

As explained so far, the communication network according to the present invention can advantageously control a quality for a specific service, and is useful for communication infrastructure such as the Internet for providing a plurality of services different in features using the packet communication.

The invention claimed is:

1. A packet communication network that is connected to a first external network and a second external network, and that executes packet communication between the first external network and the second external network for a plurality of services of which quality requirements on an end-to-end basis are different, the packet communication network comprising:
    a parallel network constituted by a plurality of physically or logically independent internal networks;
    at least one classifier connected to the first external network and to each internal network, when classifying a packet to one of the internal networks in the parallel network, the classifier identifying a packet as a voice packet when a pair of a transmission source address and a destination address as well as a destination port number are equal to a pair of addresses between which a conversation is held by a voice service and classifying the voice packet to a voice network among the internal networks; and
    at least one multiplexer that prioritizes a packet received from the voice network over a packet received from other internal networks, the at least one multiplexer being connected to each of the internal networks in the parallel network and to the second external network and multiplexing packets received from a plurality of internal networks in the parallel network when outputting a multiplexed packet to the second external network.

2. The packet communication network according to claim 1, wherein the classifier classifies a packet according to a feature amount of a form of the packet.

3. The packet communication network according to claim 2, wherein the feature amount is a packet length of the packet.

4. The packet communication network according to claim 1, wherein the classifier classifies a packet according to a feature amount of contents of the packet.

5. The packet communication network according to claim 4, wherein the feature amount is a DiffServ code point of an IP packet.

6. The packet communication network according to claim 4, wherein the feature amount is any one of a protocol number of an IP packet, a destination port number of a UDP packet, and a destination port number of a TCP packet.

7. The packet communication network according to claim 2, wherein the classifier classifies the packet according to a time series change in a sum of data amounts of packets having an equal feature amount.

8. The packet communication network according to claim 4, wherein the classifier classifies the packet according to a time series change in a sum of data amounts of packets having an equal feature amount.

9. The packet communication network according to claim 1, wherein the classifier includes a detector that detects a status of traffic of each of the networks in the parallel network, and classifies a packet according to the status of the traffic.

10. The packet communication network according to claim 1, wherein the networks in the parallel network are logically grouped into a plurality of groups so that each of the groups includes a plurality of networks that are physically same.

11. The packet communication network according to claim 10, wherein each of the groups includes a unit that dynamically changes an allocation of bands to each of the networks in the group.

12. The packet communication network according to claim 1, wherein the multiplexer preferentially processes a packet received from a specific one of the networks in the parallel network.

13. The packet communication network according to claim 1, wherein the multiplexer preferentially processes a packet having a predetermined feature amount.

14. A packet communication method, realized on a packet communication network with a plurality of internal networks in a parallel network that is connected to a first external network and a second external network, executing packet communication between the first external network and the second external network,
    the packet communication method comprising:
    a classifier, connected to the first external network and to each of a plurality of internal networks, the plurality of internal networks being physically or logically independent and in a parallel network, classifying a packet received from the first external network to one of the plurality of internal networks in the parallel network, the classifier identifying a packet as a voice packet when a pair of a transmission source address and a destination address as well as a destination port number are equal to a pair of addresses between which a conversation is held by a voice service and classifying the voice packet to a voice network among the plurality of internal networks in the parallel network;
    the one of the internal networks in the parallel network that the classifier classified the packet to transferring the packet; and
    a multiplexer, connected to each of the plurality of internal networks in the parallel network and to the second external network, multiplexing packets received from two or more internal networks in the parallel network and outputting a multiplexed packet to the second external network.

15. The packet communication method according to claim 14, wherein the classifier classifies a packet according to a feature amount of a form of the packet.

16. The packet communication method according to claim 15, wherein the feature amount is a packet length of the packet.

17. The packet communication method according to claim 14, wherein the classifier classifies a packet according to a feature amount of contents of the packet.

18. The packet communication method according to claim 17, wherein the feature amount is a DiffServ code point of an IP packet.

19. The packet communication method according to claim 17, wherein the feature amount is any one of a protocol number of an IP packet, a destination port number of a UDP packet, and a destination port number of a TCP packet.

20. The packet communication method according to claim 15, wherein the classifier classifies the packet according to a time series change in a sum of data amounts of packets having an equal feature amount.

21. The packet communication method according to claim 17, wherein the classifier classifies the packet according to a time series change in a sum of data amounts of packets having an equal feature amount.

22. The packet communication method according to claim 14, wherein the classifier detects a status of traffic of each of the networks in the parallel network, and classifies a packet according to the status of the traffic.

23. The packet communication method according to claim 14, wherein the networks in the parallel network are logically grouped into a plurality of groups so that each of the groups includes a plurality of networks that are physically same.

24. The packet communication method according to claim 23, wherein each of the groups includes a unit that dynamically changes an allocation of bands to each of the networks in the group.

25. The packet communication method according to claim 14, wherein the multiplexer preferentially processes a packet received from a specific one of the networks in the parallel network.

26. The packet communication method according to claim 14, wherein the multiplexer preferentially processes a packet having a predetermined feature amount.

* * * * *